United States Patent [19]

Steele

[11] 4,296,799
[45] Oct. 27, 1981

[54] SOLAR WATER TANK AND METHOD OF MAKING SAME

[76] Inventor: Richard S. Steele, 897 E. 12th Ave., Broomfield, Colo. 80020

[21] Appl. No.: 43,131

[22] Filed: May 29, 1979

[51] Int. Cl.³ .............................................. F28D 1/06
[52] U.S. Cl. .................................... 165/74; 165/136; 165/163; 126/437; 425/417; 264/314; 264/45.2; 220/444
[58] Field of Search ............... 126/427, 428, 435, 437, 126/400; 165/162, 136, 74, 73; 220/403, 444, 445, 448; 425/468, 417; 264/314, 269, 45.2

[56] References Cited

U.S. PATENT DOCUMENTS

| | | | |
|---|---|---|---|
| 1,333,840 | 3/1920 | Davis et al. | 220/445 |
| 1,333,841 | 3/1920 | Dummer | 165/163 |
| 2,456,513 | 12/1948 | Johnson . | |
| 2,460,820 | 2/1949 | Hagopian . | |
| 2,501,012 | 3/1950 | St. Clair | 165/74 |
| 2,644,198 | 7/1953 | Crawford . | |
| 3,137,898 | 6/1964 | Geringer . | |
| 3,177,105 | 4/1965 | Wiltshire | 264/314 |
| 3,177,501 | 4/1965 | Kwake | 220/445 |
| 3,530,208 | 9/1970 | Rausing . | |
| 3,598,357 | 8/1971 | McLean | 249/65 |
| 3,610,563 | 10/1971 | Allen . | |
| 3,808,996 | 5/1974 | Gezari | 264/45 |
| 3,937,781 | 2/1976 | Allen | 264/314 |

FOREIGN PATENT DOCUMENTS 2712822 9/1978 Fed. Rep. of Germany ...... 126/435

Primary Examiner—Carroll B. Dority, Jr.
Attorney, Agent, or Firm—John E. Reilly

[57] ABSTRACT

A solar water tank for use in solar heating systems includes an insulated tank with flow systems comprised of a plurality of inlet and outlet tubes, heat exchangers, level switch and supplemental heating element, all assembled together with the manway cover for the tank in a unitary embodiment. The tank also includes a layer of polyurethane foam insulation on its interior surface. Forming apparatus for placing the insulation layer in the tank includes a flexible synthetic membrane in the form of an enclosed bag adapted for positioning in the interior of the tank.

26 Claims, 4 Drawing Figures

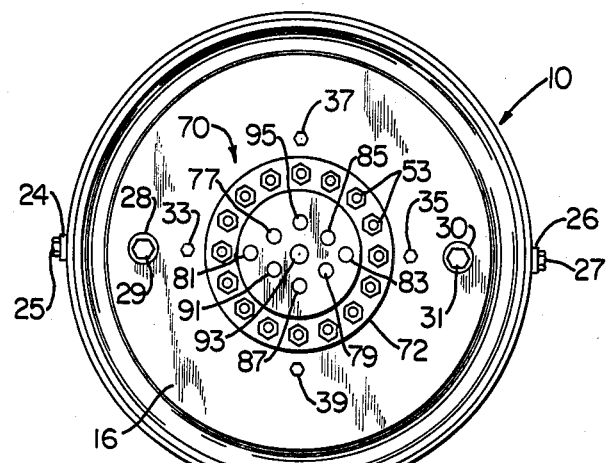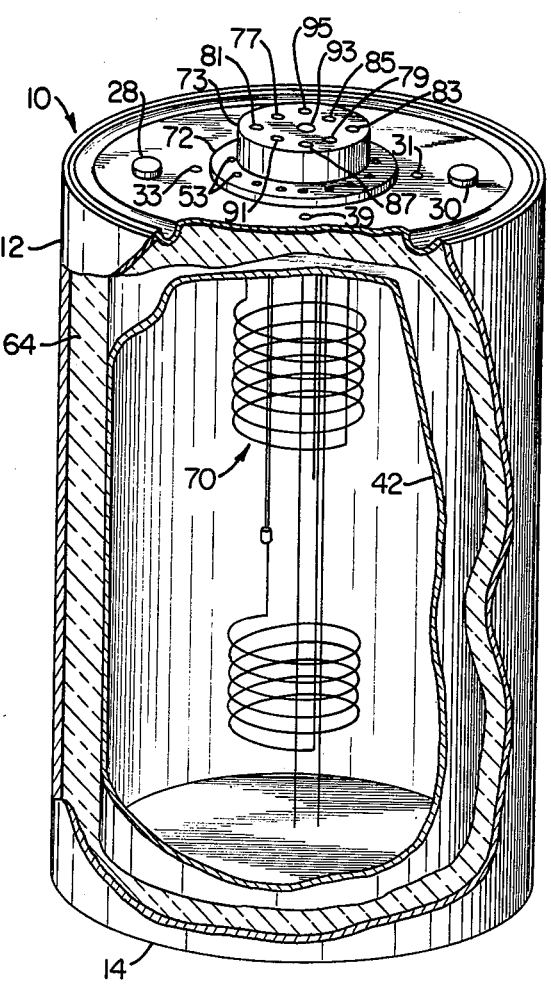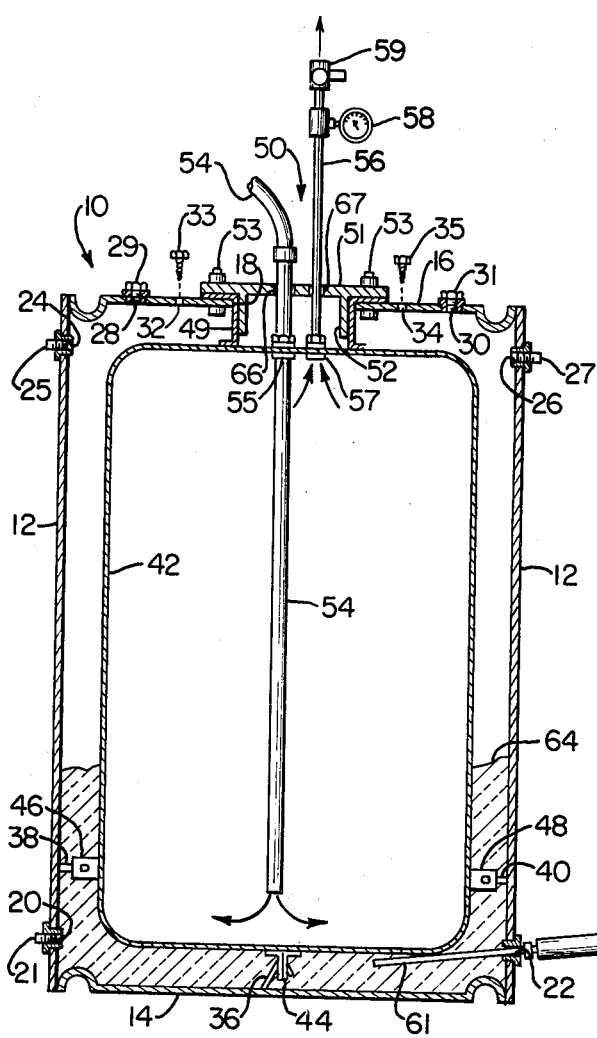

SOLAR WATER TANK AND METHOD OF MAKING SAME

BACKGROUND OF THE INVENTION

This invention relates generally to tanks, and accessories therefor, and more specifically to insulated water tanks and associated plumbing for use in solar heating systems and a method and apparatus for insulating the tanks.

There has been a significant emphasis during the past several years on the development of solar heating systems. Typical solar heating systems which utilize water or other liquid as the heat transfer medium from the solar collectors to the point where heat is utilized incorporate a large volume liquid reservoir in which a large quantity of heated by the sun liquid can be stored. The storage tank or reservoir can be used in a number of ways: For example, it can contain the working fluid for the solar collector panels wherein the fluid is stored in the tank, pumped from the tank to the solar collector panels, circulated through the solar collector panels where it is heated and then returned to the storage tank, thereby maintaining the tank full of hot water as long as sufficient heat energy can be collected from the sun to keep the water hot. If the tank is of sufficiently large capacity, the hot water stored therein can serve as a supply source of heat for use in space heating a building, heating potable water, and the like for some period after the heat from the sun is no longer available. In this type of installation, heat from the water in the storage tank can be used for example to heat potable water for domestic use by positioning a heat exchanger in the storage tank and circulating potable water through the heat exchanger where heat is transferred from the fluid in the tank to the potable water. The potable water can then be piped to either a storage tank for heated potable water or to a point of use.

In systems wherein the working fluid must be an antifreeze solution to prevent freezing in cold weather or where it is desired to use other fluids more expensive than water, it is common to place the storage tank inside a building and maintain it full of water. The water in the tank is heated by circulating solar heated working fluid from the solar collector panels through a heat exchanger where heat is transferred from the working fluid into the water in the tank. Then, the heated water in the tank can be utilized as a supply of heat. For example, the hot water in the tank can be pumped to a point of use, such as a space heater, where the heat from the water is transferred to the air, and the water is then returned to the reservoir where it is reheated by the working fluid from the solar collector panels. Also, in this type of installation, a second heat exchanger for heating potable water can be positioned in the tank whereby heat can be transferred from the heated water in the tank to the potable water supply.

It is also conventional to provide a water supply inlet pipe to supply makeup water to keep the tank storage substantially full, a level switch in the tank for sensing a drop in water level and to activate a solenoid switch in the water makeup supply pipe to allow makeup water to flow into the tank. Also, it has been found useful to provide an electrically powered supplemental heating element in the storage tank for heating the water during periods when sufficient solar energy is not available to maintain the water at desired operating temperatures for the heating systems.

In the past, the various heat exchangers, supply tubes, switches, valves, supplementary heater elements and other components have been either positioned in the tank during manufacture or positioned therein through a number of individual openings in various locations in the tank. Such tank structures are not only expensive to manufacture, but they result in significant problems and expense, particularly when the components fail since it is sometimes impossible to remove the components for inspection or repair without diassembling or partially destroying the tank to do so. It also presents problems to manufacturers of tanks for use as storage tanks in solar heating systems, because they find it necessary to either fabricate tanks on an individual custom basis or to manufacture and maintain an inventory of a variety of tanks with different components fabricated therein to meet the varying needs and requirements of different solar heating systems designs.

Further, since the primary purpose of the storage tank in typical solar heating systems is to store and retain heated water for use in the heating systems, it is desirable to minimize heat loss from the tank to the environment by insulating the tank. Insulating large tanks in a manner which is durable, neat in appearance and effective has been a problem.

SUMMARY OF THE INVENTION

Accordingly, it is an object of the present invention to provide a unitary assembly of solar heating flow systems components that can be removably positioned in a liquid storage tank.

It is also an object of the present invention to provide a water storage tank with a complete flow system assembly that can be easily removed as a unit for inspection or repair.

It is also an object of the present invention to provide a water storage tank with a plurality of inlet and outlet tubes, heat exchangers, level switch and supplemental heating elements all assembled together in a unitary, compact assembly that is removable from the interior of a water tank and which is adapted for connection to and use in conventional solar heating systems.

It is another object of the present invention to provide an improved method and apparatus for easily and inexpensively applying an insulating layer to the inside surface of a water tank.

A further object of the present invention is to provide a method and apparatus for applying a liquid resin thermosetting foam insulation to the inside surface of a water tank with a formed access opening through the insulation layer corresponding in size and position to the access opening in the tank shell.

The water storage and flow systems assembly of the present invention includes a unique assembly of inlet and outlet flow tubes, heat exchangers, water level controls, and supplementary heating elements all assembled together in a unitary manner with a manway cover adaptable for insertion of the flow system components of the assembly through the limited area of the manway access opening in a liquid storage tank. The manway cover with the flow systems components therein is adapted for releasable attachment to the tank around the peripheral surface of the access opening to cover the opening. The entire manway cover and flow systems assembly is readily detachable and removable from the tank for inspection and repair, yet it includes the necessary pipes, conduits, heat exchangers and other elements adapted for connection into conventional or typical solar heating systems which utilize a liquid as the heat transfer medium.

The inside surface of the tank is coated with a polyurethane foam layer of insulation with an opening corresponding with the access hole provided therein. The manway cover also includes a foam insulation cap with holes therethrough corresponding to the components of the flow systems assembly which extend through the manway cover.

Forming apparatus provided for forming the foam insulation on the inside surface of the storage tank includes a collapsible plastic membrane having an enclosed flexible bag of a size somewhat smaller than the internal dimensions of the tank. An air inlet pipe and an air outlet pipe are inserted through the membrane and sealed to the portions of the membrane adjacent the pipes. The inside of the tank is provided with a plurality of hooks extending inwardly from the inside surface of the tank, and corresponding outwardly extending ears are provided on the external surface of the bag. The ears are adaptable for attachment to the hooks to support the bag in appropriate position a spaced distance from the inside surface of the tank. The bag is also provided with a flexible cylindrical boot attached to and extending upwardly from the top surface of the bag around the air inlet and outlet pipes and adapted for insertion through and attachment to the peripheral edge of the access opening in the tank. A form jig is also provided for positioning over the access opening with the cylindrical portion thereof extending downwardly inside of the boot to maintain the boot in a cylindrical shape during the process of applying the insulation. The tank is also provided with a plurality of bung holes and bung plugs in spaced-apart locations around the tank, and vent holes are provided at the top of the tank. An air pressure gauge and control valve are provided on the air outlet pipe for controlling the volume and pressure of air circulating through the bag.

Insulation is applied to the inside surface of the tank by inserting the air inlet and outlet tubes through the membrane of the air bags inside the cylindrical boot and sealing them to the membrane to prevent air leakage. The bag with the air inlet and outlet pipes is then positioned in the interior of the tank through the access opening, and the ears on the external surface of the bag are attached to appropriate hooks on the inside surface of the water tank. The form jig is positioned inside and over the boot and attached to the tank over the manway access hole. An air pressure supply is connected to the air inlet pipe, and air is injected therethrough into the interior of the bag. The valve on the air outlet pipe is adjusted to maintain a slight air pressure in the interior of the bag which causes the bag to inflate to its fullest extent whereby the membrane is a substantially equally spaced concentrically within the inside surface of the tank walls. A bung hole plug is removed from a bung hole in the lower portion of the tank, and a liquid resin of thermosetting foam is injected into the lower portion of the tank in the space between the membrane and the inside surface of the tank for a period of time approximately equal to the gel time of the resin. The volume of resin injected in this time should be sufficient to substantially fill at least the lower portion of the space between the membrane and the inside surface of the tank, and the air displaced by the resin is vented through the holes in the top of the tank as the space is filled. Additional injections of the liquid resin are made in successively higher portions of the tank through appropriate bung holes provided in the tank in the same manner as described above until the entire space around the membrane between the membrane and the inside surface of the tank is substantially filled, with the exception of the portion adjacent the manway access opening which is maintained clear of the resin by the boot. Throughout this entire process, a sufficient volume of air under pressure is circulated through the bag to carry away the heat of exothermic reaction of the resin to prevent the temperature inside the bag from rising to a level above which the bag would lose its structural integrity, and the pressure in the bag must be sufficient to maintain the expanded shape of the bag as the resin foam expands and sets in the space around the bag.

BRIEF DESCRIPTION OF THE DRAWINGS

Other objects, advantages, and capabilities of the present invention will become apparent as the description proceeds taken in conjunction with the accompanying drawings, in which:

FIG. 1 is a perspective view of the insulated solar water tank with the front portion being cut away to illustrate the manway cover with flow systems assembly positioned inside the tank;

FIG. 2 is a plan view of the solar water tank;

FIG. 4 is a sectional view of the solar water tank with the insulation forming apparatus positioned therein as the insulation forming process is partially completed.

DETAILED DESCRIPTION OF THE PREFERRED EMBODIMENT

Figure 3:
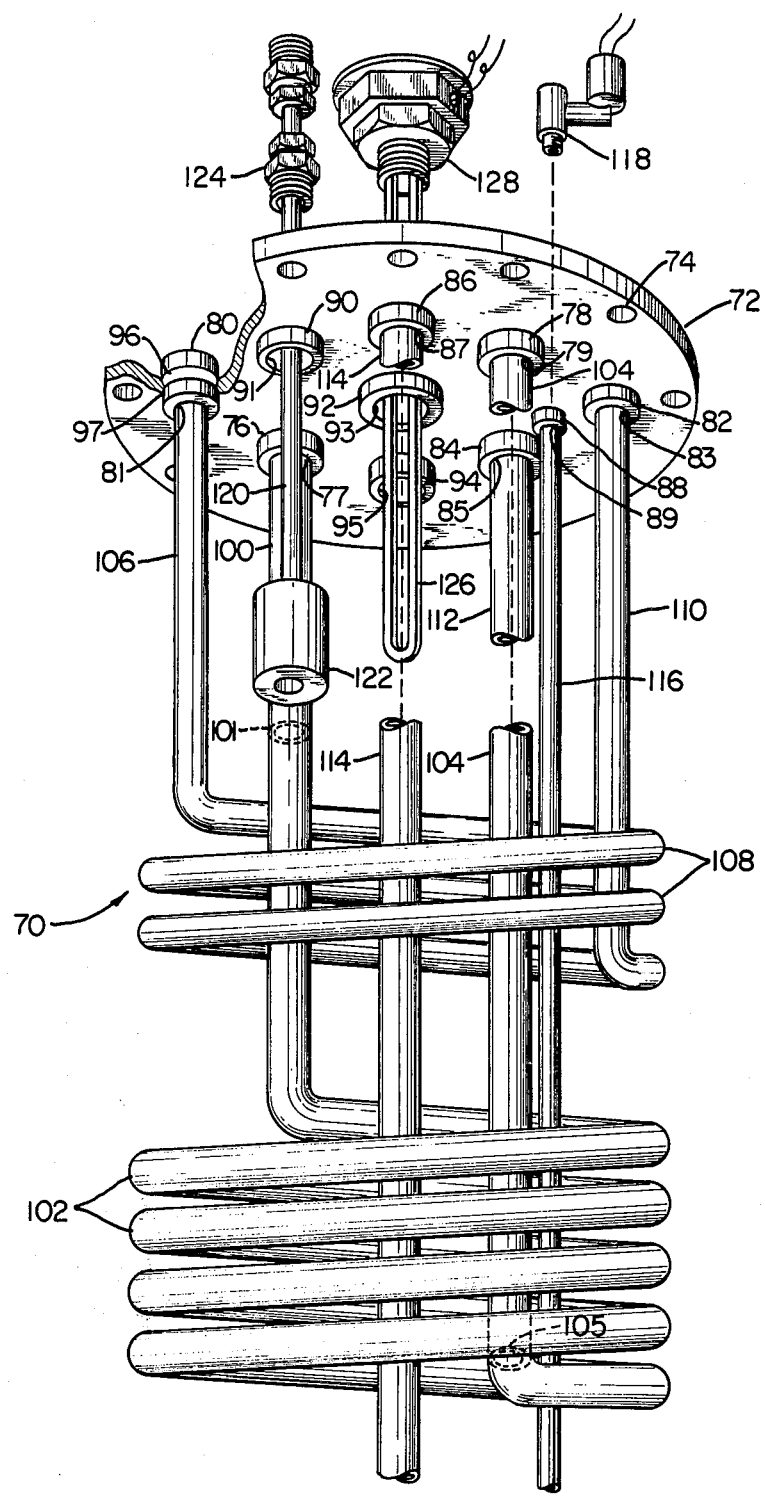
FIG. 3 is an enlarged perspective view of the components of the manway cover and flow systems assembly.

The solar water tank 10 in accordance with the present invention in FIGS. 1 and 2 is comprised of a cylindrical sidewall 12 with substantially flat circular bottom wall 14 and top wall 16. A manway access opening 18 is provided in the top wall 16 of the tank 10.

The tank also includes an inner liner 42 in the form of a flexible plastic bag positioned concentrically inside the tank 10, and a layer of polyurethane foam insulation 64 fills the space between the bag 42 and the inside surface of the tank 10.

A significant feature of the present invention is the manway cover and flow systems assembly 70 as best seen in FIGS. 1 and 3. The assembly 70 includes a flat circular manway cover 72 with bolt holes 74 around its peripheral surface and a plurality of flow systems components extending through the manway cover 72 and into the interior of the tank 10. The flow systems components include a solar fluid inlet tube 100 extending through hole 77 in sleeve 76 in the manway cover 72 and downwardly into the interior of the solar water tank 10. The lower portion of the solar fluid inlet tube 100 is in the shape of a helical coiled heat exchanger 102 which leads into a solar fluid outlet tube 104 extending upwardly through hole 79 in sleeve 78 positioned through manway cover 72.

A potable water inlet tube 106 also extends downwardly through hole 81 in sleeve 80 with its lower portion also in the shape of a helical coiled heat exchanger 108, which is positioned above the heat exchanger 102. The heat exchanger 108 then leads into a potable water outlet tube 110 extending upwardly through hole 83 in sleeve 82. A space heater feed tube 112 extends upwardly through hole 85 in sleeve 84, and a space heater return tube 114 extends downwardly through hole 87 in sleeve 86 into the interior of the solar water tank 10. A makeup water supply inlet tube 116 extends downwardly through hole 89 in sleeve 88 into the interior of the tank. A solenoid valve 118 is positioned in the makeup water supply inlet tube 116 above the manway cover 72.

A level switch rod 120 also extends downwardly through hole 91 in sleeve 90 into the interior of the tank and includes a float 122 on the lower end of the rod 120. The level switch rod 120 activates a switch which is electrically connected to the solenoid valve 118 in the makeup water supply tube 116. An immersion heater element 126 is inserted through hole 93 in sleeve 92 into the interior of the tank and is fastened thereto by fitting 128.

Each of the sleeves through the manway cover 72 is pressfit similar to that shown in the cutaway around sleeve 80 into a corresponding hole 97 in the manway cover. An O-ring seal 96 around the peripheral surface of each sleeve 80 seals against the hole 97 in the manway cover to prevent leakage and to assist in retaining the sleeve 80 in immovable position in the manway cover 72. Sleeve 94 with plug hole 95 is a spare which can be utilized for inserting another component into the water tank if desired.

It is significant to note that all of the components of the flow systems assembly, including the heat exchangers 102, 108 are confined within the space of an imaginary cylinder extending through the periphery of the manway cover 72. This feature is significant in relation to the unitary construction of the manway cover and flow systems assembly in that all of the flow systems components for conventional or typical solar heating applications can be readily and easily inserted into the tank in a unitary manner through the manway access opening 18 and secured in that position by bolting the manway cover 72 to the top wall 16 of the solar tank 10 over the manway access opening 18. Likewise, in the event any of the tubes or components require replacement or repair, it is a simple matter to unfasten the manway cover 72 and remove the cover and flow systems assembly 70 in a unitary manner from the interior of the solar water tank 10 for inspection or repair.

As an example, such a manway cover and flow systems assembly 70 as described above can be utilized in a solar system wherein a working fluid, such as an antifreeze solution or mineral oil for heat transfer purposes from the solar collector panels is maintained in a closed circuit and not allowed to flow freely into the interior of the water tank. In such an application, the interior of the solar tank 10 can be filled through the water supply makeup tube 116 and maintained full automatically by the level switch rod 120 and float 122 which activates the solenoid valve 118 as necessary to maintain the water level in the tank 10. The water in the interior of the solar water tank 10 is heated by means of solar collector panel working fluid flowing through the heat exchanger 102 where heat is transferred from the working fluid to the water supply in the interior of the tank. Potable water can then be heated by passing the potable water through heat exchanger 108 where heat is transferred from the water in the interior of the solar tank 10 to the potable water supply. Further, water can be pumped directly from the tank 10 through tube 112 to a space heater. Such a spacer heater is conventional and well known to persons of ordinary skill in the art to include a water to air heat exchanger at the point of heat use for heating space in a building. The return cooled water from the space heater can flow back into the tank 10 through the tube 126. Thus, it can be readily understood that all of the components ordinarily required for conventional or typical solar heating systems is included in the unitary manway cover and flow systems assembly 70.

In a simplified or modified solar heating system which is used only for either heating potable water or for space heating, the coil 102 can be eliminated leaving the inlet tube 100 terminating as shown in broken lines at 101 and the tube 104 terminating in the position indicated by broken lines 105. Further, if desired, an electrically powered immersion heater element 126 can be included for supplementary heating of the water within the tank to maintain desired operating temperatures when sufficient solar energy is not available to maintain the water in the tank to the desired operating temperature. As best shown in FIGS. 1 and 2, an insulation cap is also included on the upper surface of the manway cover 72 to minimize loss of heat through the cover.

The apparatus for forming the insulation layer 64 on the interior surface of the tank 10 is best seen in FIG. 4. The forming apparatus includes an enclosed flexible plastic membrane 42 in the form of a bag. An air inlet pipe 54 is inserted through the membrane 42 and sealed therein by fitting 55. Similarly, an air outlet pipe 56 is also inserted through the membrane and sealed therein by fitting 57. A pressure gauge 58 and valve 59 are also provided in the air outlet pipe 56. The bag 42 and inlet and outlet air pipe assembly is inserted into the interior of the tank 10 through manway access opening 18 and fastened for support at various locations by support members comprised of hooks 36, 38, 40 distributed at various locations around the inside surface of the tank 10 and respectively located ears 44, 46, 48 to support the bag in proper position within the tank 10. A flexible boot extension 49 in the shape of a cylinder is attached to the top of the membrane 42 and extends upwardly through the manway access opening. A forming jig 50 comprised of a substantially flat circular plate 51 with a cylindrical extension 52 extending downwardly from the plate 51 is positioned over the manway access opening 18 with the cylindrical portion 52 extending downwardly inside the cylindrical boot 49 to maintain the form of the boot 49. The jig is fastened in position by a bolt 53. Air under pressure is then introduced through the air inlet pipe 54 into the interior of the bag 42 and is allowed to escape in a controlled manner through air outlet pipe 56. By watching the pressure gauge 58 and regulating the valve 59, the volume and pressure of air within the bag 42 can be regulated and controlled. The tank 10 is also provided with a plurality of bung holes 20, 22, 24, 26, 28, 30, with associated plugs 21, 23, 25, 27, 29, and 31, respectively. The plugs in the bung holes can be removed such as that shown at 22, 23 for insertion of liquid resin injection apparatus 60. As shown in FIG. 4, the nozzle 61 of an injection gun 60 is inserted through a bung hole 32 in the lower portion of the tank 10 near the area of the hook 36 on the center bottom end of the tank. A liquid resin thermosetting foam material supplied through line 62 is then injected into the lower portion of the tank in the space between the bag 42 and the inside surface of the tank. The resin is injected for a period of time approximately equal to the gel time of the resin being injected. When the gel time is reached, injection is stopped and the liquid resin injected into the tank is allowed to expand and set. As the liquid is injected into the bottom portion of the tank, the displaced air from the space into which the liquid resin is injected is vented through the holes 32, 34 in the top of the tank. Additional injection operations are performed at successively higher intervals through appropriately positioned bung holes as described for the first injection until the space between the bag 42 and the inside surface of the tank is substantially filled with the polyurethane foam insulation material. The boot 49 retained by the cylindrical form portion 18 of jig 50 is effective to maintain an opening in the insulation corresponding to the manway access opening 18 in the top of the tank.

During the resin injection operations, a significant amount of heat is generated by the curing resin. Therefore, it is necessary to maintain a sufficient volume of air flowing through the bag at all times to cool the interior of the bag and maintain the temperature therein to below an approximately maximum of 220°, otherwise the structural integrity of the bag would be impaired and could fail allowing the liquid resin to flow into the interior space occupied by the bag 42. Also, with the displaced air being vented through holes 32, 34 in the top of the tank, it has been found satisfactory to maintain the air pressure within the bag at approximately ¼ p.s.i.g. to maintain the shape of the bag 42 and keep the pressure of the expanding resin foam from deforming the bag 42.

After the space between the bag 42 and the inside surface of the tank is filled with the resin foam insulation material, the vents 32, 34 are closed and sealed by self-tapping screws 33, 35, respectively. The jig 50 and the air inlet and outlet pipes 54, 56, respectively, can be removed after the resin has set. The bung plug can also then be replaced in the bung holes to further seal the tank, and the tank is then ready for use as an insulated water storage reservoir and solar heating systems. The top portion of the bag 14 in the area inside the boot 49 can then be cut out to provide an unobstructed opening into the interior of the tank, and the air inlet and outlet pipes 54, 56 can be removed. As described above, the flow systems assembly with all of the necessary components for conventional solar heating systems can then be positioned in the interior of the tank in a unitary manner with the manway cover and the flow systems can then be connected to the appropriate flow lines of the solar heating systems.

In a production line setting, the tanks can be placed on an assembly line conveyor with the bung hole plugs removed and the vent holes open. The flexible synthetic membrane, form jig, and inlet and outlet pipes are inserted through the manway access opening into the tank, and the bag is inflated. A plurality of foam injection nozzles are automatically inserted through the open bung holes into the space between the bag and the inside surface of the tank. Liquid resin is then injected automatically from the injectors into the tank in predetermined timed sequential order from the bottom to top of the tank, with the time of successive injections at sequentially higher intervals being no greater than the gel time of the resin injected.

Although the present invention has been described with a certain degree of particularity, it is understood that the present disclosure has been made by way of example and that changes in details and structure may be made without departing from the spirit thereof.

I claim:

1. A water tank adapted for solar heating systems, comprising:

an insulated rigid shell enclosing a chamber therein adapted for containing a fluid medium, said shell having an access hole therein, including a flexible plastic liner positioned within said chamber around the periphery thereof a spaced distance inwardly from said shell, and a foam insulation material uniformly filling the space between said shell and said liner;

an insulated cover for said access hole adapted to be positioned over said access hole and to be removably attached in that position to said shell;

a flow systems assembly extending through and attached to said cover, said flow systems assembly including fluid inlet and outlet tubes and water inlet and outlet tubes for conducting the flow of fluids and water, respectively, into and out of said chamber, and heat exchanger means for facilitating heat transfer from the fluid to the water within said chamber; and attachment means on said cover and said shell for removably attaching said cover to said shell over said access hole with said flow systems assembly extending therethrough and positioned inside said shell.

2. The water tank of claim 1, wherein said inlet and outlet tubes are characterized by a solar collector fluid inlet tube positioned through and attached to said cover, a solar collector fluid outlet tube positioned through and attached to said cover, a potable water inlet tube positioned through and attached to said cover, a potable water outlet tube positioned through and attached to said cover, and potable water heat exchanger means attached in fluid flow communication to said potable water inlet tube and to said potable water outlet tube in such a manner as to accommodate flow of potable water therethrough for enhancing heat transfer from a fluid medium in said chamber to the potable water.

3. The water tank of claim 2, wherein said potable water heat exchanger means includes a portion of coiled tube connected at one end to said potable water inlet tube and connected at the other end to said potable water outlet tube.

4. The water tank of claim 2, wherein said flow systems assembly includes a space heater fluid feed tube positioned through and attached to said cover, a space heater fluid return tube positioned through and attached to said cover, and solar collector fluid heat exchanger means attached in fluid flow communication to said solar collector fluid inlet tube and to said solar collector fluid outlet tube in such a manner as to accommodate flow of solar collector fluid therethrough for enchancing heat transfer from said solar collector fluid to a fluid medium in said chamber.

5. The water tank of claim 4, wherein said solar collector fluid heat exchanger means includes a portion of coiled tube connected at one end to said solar collector fluid inlet tube and connected at the other end to said solar collector fluid outlet tube.

6. The water tank of claim 4, wherein said flow systems assembly includes a makeup water supply tube positioned through and attached to said makeup water supply tube.

7. The water tank of claim 4, wherein said flow systems assembly includes an electrically powered water heating element attached to said cover and extending into said chamber.

8. The water tank of claim 2, wherein said attachment means includes a flange around the perimeter of said cover with a plurality of spaced-apart holes through said flange and a plurality of bolts extending through said flange and through similarly aligned holes in said shell around said access hole for securing said cover on said shell over said access hole.

9. The water tank of claim 1, including a foam insulating material secured to the surface of said cover and a flexible plastic cylindrical boot extending upwardly from said liner through said access opening and squeezed between said flange and said container.

10. The water tank of claim 1, including a plurality of hooks attached to the inside surface of said shell in spaced-apart relation to each other, and said liner includes a plurality of ears extending outwardly therefrom in alignment with said hooks and adapted to be attached to said hooks for retaining said liner a uniformly spaced distance inwardly from said shell.

11. The water tank of claim 10, including a multiplicity of bung holes with mating bung plugs distributed around the periphery of said shell, at least one of said bung holes and mating bung plug being positioned in the bottom portion of said shell, and at least one vent hole positioned in the top surface of said shell.

12. Forming apparatus for use in insulating the inside surface of an enclosure, including:
a substantially enclosed tank defining the enclosure; and
a flexible, inflatable bag adapted for positioning in the interior of said tank, said bag including a plurality of bag support means connected to the tank and positioned in a plurality of locations spaced around the peripheral surface of said bag and adapted for retaining said bag in uniformly spaced-apart relation from the inside surface of the tank, said bag being a completely enclosed membrane and including a cylindrical boot attached to and extending upwardly from a portion of said membrane means for sealing said boat around the periphery of an opening in a wall of the tank.

13. The forming apparatus of claim 12, including an inlet pipe inserted through and sealed to the portion of said membrane inside said boot, said inlet pipe being adapted for connection to an air pressure source.

14. The forming apparatus of claim 13, including an outlet pipe inserted through and seated to the portion of said membrane inside said boot, and air bleed control means on said outlet pipe outside said membrane for controlling the rate of air discharged from said membrane and the pressure of the air inside the membrane.

15. The forming apparatus of claim 14, wherein said bleed control means includes an air pressure gauge attached in said outlet pipe and a valve in said outlet pipe downstream of said pressure gauge.

16. The forming apparatus of claim 15, including a jig fastener for maintaining the form of said boot and for securing said boot to the wall of said tank around the periphery of said opening, including a plate adapted for overlaying said opening with a flange around its periphery adapted for removable attachment to said tank wall around said opening when the distal end portion of said boot is positioned between said flange and said tank wall, and a cylindrical portion extending downwardly from said plate portion adapted for insertion into said boot for maintaining the cylindrical shape of said boot during the insulating process, said plate also having an opening therein to accommodate said inlet and outlet pipes positioned therethrough.

17. The forming apparatus of claim 12, wherein said bag support means includes a hook protruding from the inside surface of the tank and an ear with a hole therein protruding outwardly from the bag adapted for engagement with the hook.

18. The forming apparatus of claim 12, including a plurality of bung holes through the tank with removable plugs, said bung holes being positioned in spaced-apart relation to each other around the tank, and vent holes in the top wall of the tank.

19. The method of insulating a tank, comprising the steps of:
positioning an inflatable flexible bag in the interior of the tank;
attaching said bag in spaced-apart relation to the inside surface of said tank in a plurality of spaced-apart locations around the periphery of the bag to retain the bag in spaced-apart relation to the inside surface of said tank;
inflating said bag until it substantially fills the interior of said tank while leaving a space between said bag and the inside surface of said tank; and
injecting a foam forming, thermal setting liquid resin material into the bottom portion of said tank between the bag and the inside surface of the tank and allowing said resin to expand throughout the space between said bag and the inside surface of said tank and to set in the form of an insulating foam in said space.

20. The method of insulating a tank according to claim 19, including the steps of attaching an extension boot to the upper portion of the bag, extending the boot outwardly through an access opening in the wall of the tank and fastening said boot in that position, inserting an air inlet pipe and an air outlet pipe through said access opening and said boot into said bag and sealing said inlet and outlet pipes to the portions of said bag adjacent thereto, positioning a pressure gauge in said outlet pipe, positioning a valve in said outlet pipe downstream from said pressure gauge, injecting air into said bag under pressure, and controlling the air pressure inside said bag during the insulating process by adjusting the valve in the outlet pipe to bleed sufficient air out of the bag to maintain the desired pressure in the bag and to ventilate heat from inside the bag to the atmosphere.

21. The method of insulating a tank according to claim 20, including the steps of injecting sufficient air into the bag and bleeding sufficient air from the tank to maintain pressure in the bag at approximately ¼ p.s.i.g.

22. The method of insulating a tank according to claim 21, wherein a flexible synthetic bag is placed in said tank and sufficient air is injected into said bag and bled from said bag to maintain the temperature in said bag at less than approximately 220° F.

23. The method of insulating a tank according to claim 21, including the step of venting air from the space between the bag and the inside surface of the tank through the top of the tank as said liquid resin material is injected into the bottom portion of said tank.

24. The method of insulating a tank according to claim 23, including the steps of injecting said liquid resin into successively higher portions of said tank as resin in the immediately preceding lower portion injected begins to gel.

25. The method of insulating a tank according to claim 24, wherein a resin injection nozzle is inserted through a bung hole in the lower portion of the sidewall of the tank to a position under the bag near the approximate bottom center portion of the tank and injecting liquid resin in that position for a time approximately equal to the gel time of the resin being used, withdrawing the nozzle from that position, reinserting the nozzle through another bung hole in a higher portion of the tank above the height to which the resin in the lower portion rises during its expansion and setting phase, and injecting resin in this second position for a time approximately equal to the gel time of the resin, then withdrawing the nozzle and repeating these injection steps in successively higher intervals until the space between the bag and the inside surface of the tank is substantially filled with expanded set resin.

26. The method of insulating a tank according to claim 24, wherein a plurality of injection nozzles are inserted through a plurality of bung holes into the tank, at least one of which bung holes is positioned in the lower portion of the tank and at least one of which bung holes is positioned in the upper portion of the tank, and injecting liquid resin from the injectors into the tank in automatically timed sequential order from bottom to top of the tank, with the time of the successive injections at sequentially higher intervals being no greater than the gel time of the resin injected, until the space between the bag and the inside surface of the tank is substantially filled with expanded set resin.

* * * * *